(12) United States Patent
Hartman et al.

(10) Patent No.: US 7,642,027 B2
(45) Date of Patent: Jan. 5, 2010

(54) CONTROL OF CRAZING, CRACKING OR CRYSTALLIZATION OF A CHARGE TRANSPORT LAYER IN A PHOTOCONDUCTOR

(75) Inventors: James Alan Hartman, Broomfield, CO (US); Ronald Harold Levin, Lafayette, CO (US); Weimei Luo, Louisville, CO (US); Dat Quoc Nguyen, Platteville, CO (US); Tanya Yvonne Thames, Aurora, CO (US)

(73) Assignee: Lexmark International, Inc., Lexington, KY (US)

(*) Notice: Subject to any disclaimer, the term of this patent is extended or adjusted under 35 U.S.C. 154(b) by 478 days.

(21) Appl. No.: 11/535,735

(22) Filed: Sep. 27, 2006

(65) Prior Publication Data

US 2008/0076051 A1 Mar. 27, 2008

(51) Int. Cl.
*G03G 15/02* (2006.01)
(52) U.S. Cl. .................. 430/58.05; 430/75; 399/159; 428/413; 525/523
(58) Field of Classification Search ............ 430/58.05, 430/75; 428/413; 525/523; 399/159
See application file for complete search history.

(56) References Cited

U.S. PATENT DOCUMENTS

| | | | |
|---|---|---|---|
| 5,413,886 A | 5/1995 | Pai et al. | |
| 5,415,962 A | 5/1995 | Kanemaru et al. | |
| 6,183,921 B1 | 2/2001 | Yu et al. | |
| 2004/0161683 A1* | 8/2004 | Wu et al. | 430/59.1 |

* cited by examiner

*Primary Examiner*—Mark A Chapman
(74) *Attorney, Agent, or Firm*—Elizabeth C. Jacobs

(57) ABSTRACT

A charge transport composition is provided including a cyclo-aliphatic ether compound. One purpose of the cyclo-aliphatic ether compound is to improve the resistance to crazing, crystallization and etching of the charge transport layer. The charge transport composition may be coated along with a charge generation composition onto a conductive substrate to form a photoconductor. The charge transport composition may therefore be employed in a photoconductor located in a printer or a printer cartridge.

20 Claims, 2 Drawing Sheets

CONTROL OF CRAZING, CRACKING OR CRYSTALLIZATION OF A CHARGE TRANSPORT LAYER IN A PHOTOCONDUCTOR

CROSS REFERENCES TO RELATED APPLICATIONS

This patent application is related to the U.S. patent application Ser. No. 11/144,307, filed Jun. 3, 2005, entitled "PLASTICIZED PHOTOCONDUCTOR" and assigned to the assignee of the present application.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of Invention

The present invention relates to a charge transport formulation and photoconductors having improved crazing/cracking or crystallization resistance. In particular, the present invention relates to a charge transport formulation suitable for use in a photoconductor containing a cyclo-aliphatic compound to reduce printing defects.

2. Description of the Related Art

Organic photoconductors may incorporate a laminate structure including a charge generation layer (CGL) and a charge transport layer (CTL) coated over a conductive substrate. A charge generation layer may include a pigment dispersed in one or more types of binders. A charge transport layer, which may be the outer layer, may include one or more charge transport compounds and a binder.

In some instances, it is preferable that the surface of the photoconductor be relatively smooth and free of any defects that may occur in the laminate structure, and particularly in the charge transport layer, including cracking, crazing, or crystallization of the charge transport molecules. Such photoconductor defects may lead to image defects and increased residual discharge. One Japanese reference to Nomori et. al and purportedly assigned to Konsihiroku Photo Industry Company, Ltd, Japan (with other specific details apparently lost) describes the use of an n-propylcarbazole as a plasticizer to help prevent crack formation.

SUMMARY OF THE INVENTION

In an exemplary embodiment the present disclosure is directed at a charge transport composition. The charge transport composition may include a charge transport compound, a binder, and a cyclo-aliphatic ether compound of the structure:

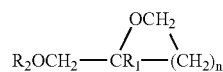

wherein n has a value of 0-10, $R_1$ is a hydrogen atom, an aliphatic or aromatic group, and $R_2$ is a hydrogen atom, an aliphatic group, an aromatic group, or an aliphatic/aromatic group. The charge transport composition may be utilized to form a photoconductor and may be employed in a printer.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
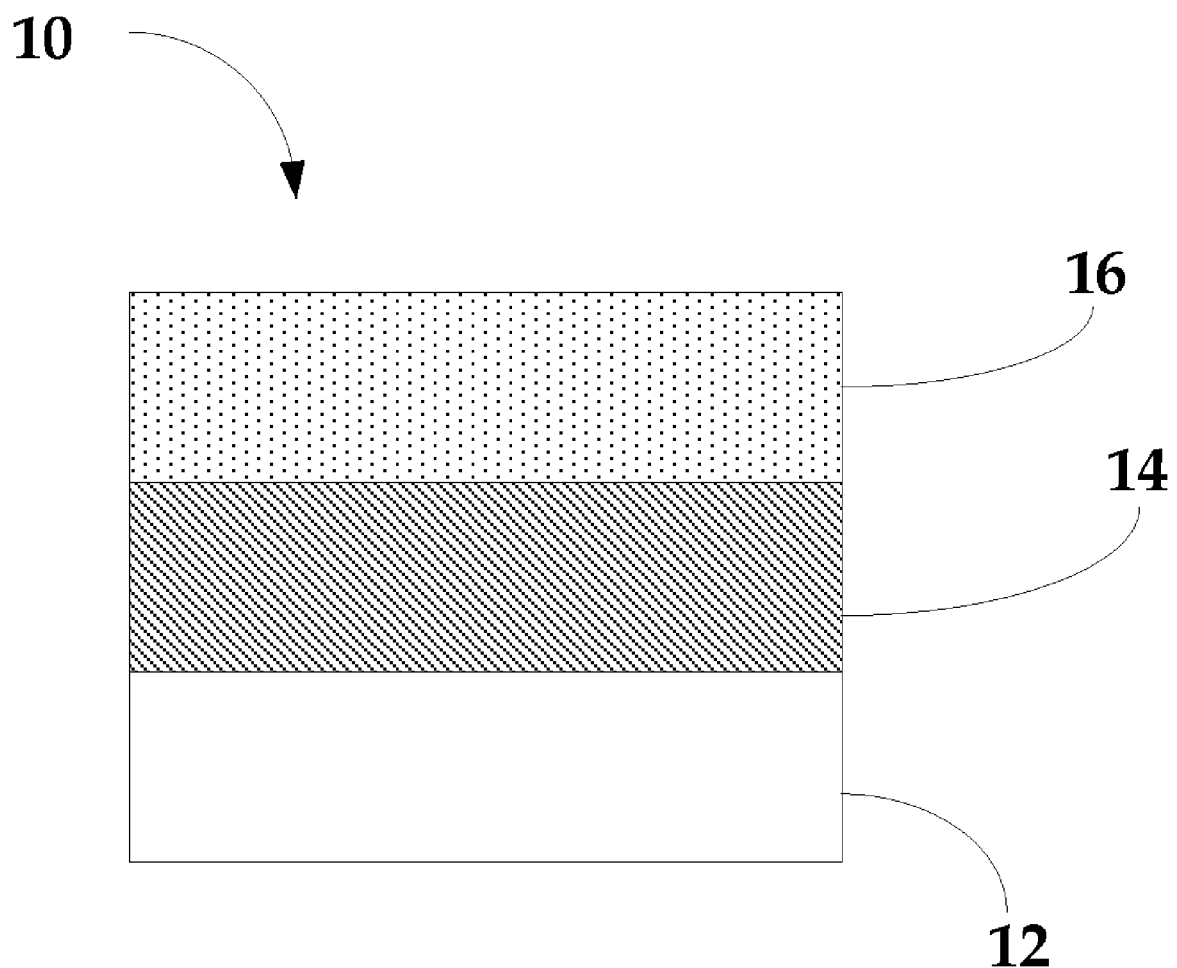
FIG. 1 illustrates an exemplary laminate structure of a photoconductor.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The present disclosure relates to a photoconductor that may be used in an image forming apparatus or printer, such as a laser printer, fax, copy machine, multi-purpose machine or all-in-one device. As illustrated in FIG. 1, the photoconductor may include a laminate structure 10 that incorporates a conductive substrate 12, a charge generation layer 14 and a charge transport layer 16. The charge generation layer 14 and charge generation compound therein may serve to generate positive and negative charges when exposed to light and may be understood as a layer which absorbs light and generates electron-hole pairs. The charge transport layer 16 and charge transport compound therein may serve to transport either positive or negative charges that are produced by the charge generation layer 14 and may be understood as a layer that may assist in the migration of the charges to the photoconductor surface.

The substrate 12 may include a conductive material or a material coated with a conductive material. In an exemplary embodiment, the substrate 12 may be formed from aluminum, which may be anodized. The substrate 12 may be coated with a charge generation layer (CGL), which may include a pigment dispersed in one or more types of binders. The charge generation layer 14 may be between 0.001 to 5 μm in thickness, including all increments and values therein, such as less than 1 μm, 0.2-0.3 μm, etc.

The charge generation layer 14 may include titanyl phthalocyanine. Other pigments that may be used in the charge generation layer 14 may include azo compounds, anthraquinone compounds, polycyclic quinone compounds, indigo compounds, diphenylmethane compounds, azine compounds, cyanine compounds, quinoline compounds, benzoquinone compounds, naphthoquinone compounds, naphthalkoxide compounds, perylene compounds, fluorenone compounds, squarylium compounds, azuleinum compounds, quinacridone compounds, other phthalocyanine compounds, naphthaloxyanine compounds, porphyrin compounds, and mixtures thereof.

Exemplary binders that may be included in the charge generation layer 14 include thermoplastic or thermoset materials. For example, butyral resins, styrene based materials, poly(methyl-phenyl)siloxane, polyhydroxystyrene, ordered co-polyestercarbonate, a noncrystalline mixture of bisphenol molecules such as bisphenol A, methyl bisphenol A, bis(2-hydroxy phenyl) methane and bis(4-hydroxy phenyl) methane; polycarbonates, polyvinyl chloride, polyesters, polyvinyl acetate, vinyl chloride/vinyl acetate copolymers, polyvinyl acetal, alkyd resin, acrylic resin polyacrylonitrile, polyamide, polyketone, polyacrylamide, and mixtures thereof. A binder therefore may be understood as any compound that retains the charge generation compound or charge transport compound (see below) on the photoconductor.

The charge generation layer 14 may be coated with a charge transport layer (CTL) 16. Such charge transport layer 16 may be formed by one or more charge transport compounds and a binder. The charge transport layer 16 may be in the range of 10 μm to 50 μm in thickness, including all increments and values therein, such as 23-29 μm, 24-26 μm, etc. The charge transport compounds may include aromatic tertiary amines, such as triphenylamine, dibenzylaniline, tri(p-tolyl)-amine, N,N'-Bis-(3-methylphenyl)-N-N'-Bis-(phenyl)-benzidine; hydrazones, such as 4-N,N-bis(4-methylphenyl)-amino-benzaldehyde-N,N-diphenylhydrazone or 9-(p-diethylamino-benzylidenehydrazono) fluorene, or p-(diethylamino)benzaldehyde diphenylhydrazone, fluorenyl-azine derivatives, arylamines, oxadiazole derivatives, pyrazoline derivatives, quinazoline derivatives, other benzidines, other triphenylmethanes, stilbenes, butadienes and mixtures thereof. Exemplary binders used in the charge transport layer 16 may include those listed above as being capable of use in the charge generation layer.

The charge transport layer 16 may also include an additive that may regulate the cracking, crazing or crystallization tendency of the charge transport layer noted above. Such additive may be sourced from a cyclo-aliphatic ether compound of the general structure:

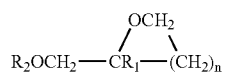

wherein the value of n may be between 0-10; $R_1$ may be a hydrogen atom, an aliphatic or aromatic group, $R_2$ may be a hydrogen, an aromatic group, an aliphatic group, or an aliphatic/aromatic group. By aliphatic/aromatic group it is meant to include a combination of aliphatic and aromatic functionality. One example of an aliphatic group would be —$(CH_2)_x$—$CH_3$ wherein x may have a value of 0-20. In the event that n is zero it may be understood that the general structure may be as follows:

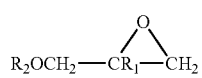

In such exemplary embodiment, when n is zero, $R_1$ is hydrogen, and $R_2$ is —$(CH_2)_x$—$CH_3$, the value of x may be 5-15 and any value or range therein, as well as mixtures of different compounds. For example, x may have a value of 7 in combination with a compound wherein x has a value of 9, as illustrated below.

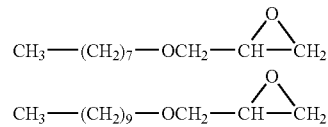

The above may therefore also be referred to as a mixture of octyl glycidyl ether (OGE) and decyl glycidyl ether (DGE). The mixture may therefore be indicated by the term ODGE. The two compounds above may therefore be present as a mixture at 1-99% by weight (wt.) OGE and 99-1% by weight (wt.) DGE including all values and increments therein.

The charge transport layer 16 may be formulated as a composition wherein the charge transport compound may be present in the range of 5 and 50% by weight including all values and increments therein, the binder may be present in the range of 25-95% by weight including all values and increments therein, and the additive described above may be present in the range of 1 to 25% by weight, including all values and increments therein. Accordingly, the charge transport compound, binder and additive or additives may be combined with an organic solvent or a mixed solvent, such as tetrahydrofuran, 1,4-dioxane, 2-butanone, cyclohexanone, etc. and combinations thereof. In addition, the solvent or mixed solvents may include an aprotic polar solvent. Once mixed, the photoconductor may be coated with the charge transport layer 16 and the solvent may then be removed. This may be accomplished by heating, which may occur for a few minutes to a few hours, including all ranges and increments therein, such as 1 minute to 24 hours.

The resulting charge transport layer 16 may then serve as a portion of a photoconductor having improved mechanical properties as noted earlier, which include resistance to mechanically induced crazing or cracking. This may be achieved as the presence of the additive may reduce internal stresses that may be typically produced during removal of the solvent and the formation of the charge transport layer 16. Accordingly, a craze or a crack may be understood herein as a feature in the surface of the photoconductor that may cause a visible printing defect. Furthermore, the resulting charge transport layer 16 herein may provide a photoconductor surface substantially free of cracking, crystallization or etching in various environmental conditions typically experienced during printer use and upon visual inspection up to 1,000× magnification. Such cracking, which may form print defects, may be understood to be cracks in the CTL having a width of greater than or equal to about 100 nanometers. The length of such cracks may vary, and may have any given length, and may be as small as about 0.50 mm and greater. Accordingly, the length of the cracks may vary from about 0.50 mm to about 5.0 mm, including all values and increments therein, and the present invention is capable of reducing and/or eliminating the formation of such cracks of such indicated width and length values.

In addition, as noted above, the incorporation of the cyclo-aliphatic ether compounds in the charge transport layer 16 may reduce the tendency of the charge transport compounds to crystallize, which may also separately promote the formation of a crack or craze in the charge transport layer 16. Crystallization may also lead to increase residual discharge and image defects. Crystallization of the molecules that provide the charge transport capability may occur under conditions such as higher operating temperatures, mechanical stress or exposure to chemicals. Crystallization may also occur when the concentration of the charge transport compound is increased beyond certain levels. The use of the cyclo-aliphatic ether compounds may therefore reduce the tendency and/or amount of crystallization that may occur for a given charge transport compound dispersed in a binder, as opposed to the tendency and/or amount of crystallization that would occur in the absence of the cyclo-aliphatic ether compound additive.

The use of the cyclo-aliphatic ether compound additives herein may also beneficially provide relatively no effect on the efficiency of photo-induced decay (PID) for a given charge transport layer. Photo-induced decay may be understood as the discharge voltage as a function of laser energy at, for example, 780 nm. Accordingly, the photo-induced decay herein of a charge transport layer 16 containing the additives described herein may illustrate a relatively small difference in the electrical properties of a given photoconductor, as compared to a photoconductor that does not contain such additives.

EXAMPLES

The following examples are presented for illustrative purposes only and are not meant to limit the scope of the specification and claims appended hereto.

Example A

25% CTM-1

The charge generation layer 14 was formed by a dispersion of titanyl phthalocyanine (type IV), polyvinylbutyral (BX-1, Sekisui Chemical Co.), poly (methyl-phenyl) siloxane and polyhydroxystyrene in a ratio of 45/27.5/24.75/2.75 in a mixture of 2-butanone and cyclohexanone. The charge generation dispersion was dip-coated on aluminum substrate and dried at 100° C. for 15 minutes to give a thickness of less than 1 μm and more preferably, 0.2-0.3 μm. The substrate included an anodized and sealed aluminum core.

The charge transport layer 16 was prepared by dissolving 4-N,N-bis(4-methylphenyl)-amino-benzaldehyde-N,N-diphenylhydrazone (CTM-1) (25 g), and polycarbonate A (Makrolon 5208, Bayer, Inc.) (75 g) in a mixed solvent of tetrahydrofuran and 1,4-dioxane. The charge transport layer 16 was coated on top of a charge generation layer of Example A and cured at 100° C. for 1 hour to give a thickness of 26-29 μm.

Example B

35% CTM-1

The charge transport layer 16 was prepared by dissolving 4-N,N-bis(4-methylphenyl)-amino-benzaldehyde-N,N-diphenyl hydrazone (CTM-1) (35.9 g) and polycarbonate A (Makrolon 5208, Bayer, Inc.) (66.7 g) in a mixed solvent of tetrahydrofuran and 1,4-dioxane. The charge transport layer 16 was coated on top of a charge generation layer of Example A and cured at 100° C. for 1 hour to give a thickness of 25-27 μm.

Example C

25% CTM-1 with 5% ODGE

The charge transport layer 16 was prepared by dissolving 4-N,N-bis(4-methylphenyl)-amino-benzaldehyde-N,N-diphenyl hydrazone (CTM-1) (26.8 g), octyl/decyl glycidyl ether (ODGE) (5.36 g) and polycarbonate A (Makrolon 5208, Bayer, Inc.) (75 g) in a mixed solvent of tetrahydrofuran and 1,4-dioxane. The charge transport layer 16 was coated on top of a charge generation layer 14 of Example A and cured at 100° C. for 1 hour to give a thickness of 26-28 μm.

Example D

35% CTM-1 with 5% ODGE

The charge transport layer 16 was prepared by dissolving 4-N,N-bis(4-methylphenyl)-amino-benzaldehyde-N,N-diphenyl hydrazone (CTM-1) (38.9 g), octyl/decyl glycidyl ether (ODGE) (5.56 g), and polycarbonate A (Makrolon 5208, Bayer, Inc.) (66.7 g) in a mixed solvent of tetrahydrofuran and 1,4-dioxane. The charge transport layer 16 was coated on top of a charge generation layer 14 of Example A and cured at 100° C. for 1 hour to give a thickness of 27-29 μm.

Example E

25% CTM-1 with 5% ODGE

The charge transport layer 16 was prepared by dissolving 4-N,N-bis(4-methylphenyl)-amino-benzaldehyde-N,N-diphenyl hydrazone (CTM-1) (51.6 g), octyl/decyl glycidyl ether (ODGE) (10.3 g), 9-(p-diethylaminobenzylidene-hydrazono)fluorene (1.03 g), and polycarbonate A (Makrolon 5208, Bayer, Inc.) (143.4 g) in a mixed solvent of tetrahydrofuran and 1,4-dioxane. The charge transport layer 16 was coated on top of a charge generation layer 14 of Example A and cured at 100° C. for 1 hour to give a thickness of 24-26 μm.

Example F

40% CTM-1 with 5% ODGE

The charge transport layer 16 was prepared by dissolving 4-N,N-bis(4-methylphenyl)-amino-benzaldehyde-N,N-diphenyl hydrazone (CTM-1) (88.9 g), octyl/decyl glycidyl ether (ODGE) (11.12 g), 9-(p-diethylaminobenzylidene-hydrazono)fluorene (1.11 g), polycarbonate A (Makrolon 5208, Bayer, Inc.) (90.9 g) and polycarbonate Z-400 (Mitsubishi Gas Chemical Co., Inc.) (30.3 g) in a mixed solvent of tetrahydrofuran and 1,4-dioxane. The charge transport layer 16 was coated on top of a charge generation layer 14 of Example A and cured at 100° C. for 1 hour to give a thickness of 25-27 μm.

The photoconductors of the above formulations were tested by placing lotion-rich fingerprints or lotion drops directly on the drum surface. The drums with fingerprints or lotion drops were then placed in an oven pre-set at 60° C. Charge transport layer crazing or cracking and crystallization was monitored by visual inspection. The drums that passed the visual test were then examined under microscope (up to 1000× magnification.)

The photoconductor rolls of the above formulations were also tested by banding the rolls to charge rollers (parallel to each other) to simulate their arrangement in a printer cartridge. The banded roll combination(s) were then placed in an environmental chamber at 43° C. and 80% relative humidity for 18 days. Upon removal, the photoconductor roll surfaces were inspected visually and via microscope for any effect on the charge transport layer caused by the charge roll. Permanent effects were usually in the form of either a) crazing or cracking or b) etching wherein the photoconductor charge transport layer 16 exhibits hazing, and appears to have been "etched" by the charge roll.

The results of the "lotion test" and the environmental charge roll test are summarized in Table 1.

TABLE 1

Test Results

| | | | Lotion/Finger Print Test | | Environmental Charge Roll Test | |
|---|---|---|---|---|---|---|
| Example | Description | ODGE | Crazing | Crystal-lization | Crazing | Etching |
| A | 25% CTM-1 | 0% | Yes | Yes | Yes | No |
| B | 35% CTM-1 | 0% | Yes | Yes | Yes | Yes |
| C | 25% CTM-1 | 5% | No | No | No | No |
| D | 35% CTM-1 | 5% | No | No | No | Yes |
| E | 25% CTM-1 | 5% | No | No | No | No |
| F | 40% CTM-1 | 5% | No | No | No | Yes |

As can be seen in the above table, the addition of a cyclo-aliphatic ether compound to the charge transport layer 16 generally improved the crazing, crystallization and etching properties of the photoconductor surface, particularly when the charge transport compound is present at levels of about 25% (wt.) or lower. Etching, being a surface defect, eventually wears away in the printer. Crazing penetrates the entire CT layer and thus is a permanent, more severe defect. Therefore, perhaps most importantly, the more severe defect, crazing, is eliminated in CTM loadings up to and including 40% (wt.).

Figure 2:
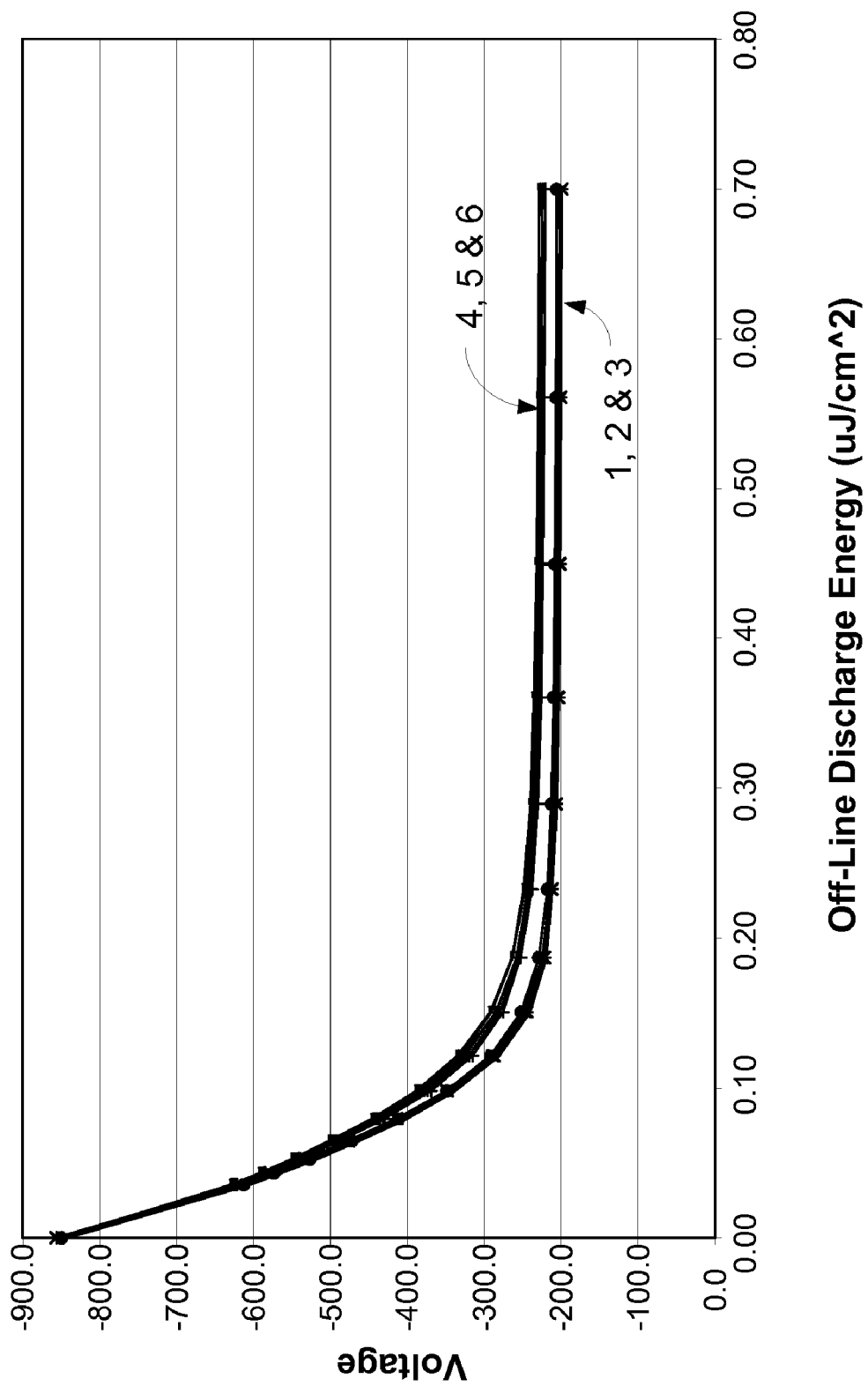
FIG. 2 illustrates exemplary photo induced decay of photoconductors of the indicated cyclo-aliphatic ether compounds.

In addition, the photo induced decay of three photoconductors including 25% hydrazone CTM-1 of example A without octyl/decyl glycidyl ether and three photoconductors including 25% hydrazone CTM-1 with 5% of octyl/decyl glycidyl ether of example C was determined by charging the photoconductor surface and measuring the discharge voltage as a function of laser energy at 780 nm at 49 ms. FIG. 2 illustrates that additions of the octyl/decyl glycidyl ether had a relatively small effect, less than +50V, on the electrical properties of the charge transport layer 16 and the capability of the photoconductor to be discharged. Curves 1, 2 and 3 in FIG. 2, which are nearly superimposable, represent the photo induced decay of the three photoconductors including 25% hydrazone CTM-1 described in example A. Curves 4, 5 and 6, which are also nearly superimposable, represent the photo induced decay of the three photoconductors including 25% hydrazone CTM-1 with 5% octyl/decyl glycidyl ether described in example C. Accordingly, the photoconductor containing the cyclo-aliphatic additive herein may exhibit a discharge voltage in the range of −100V to −400V at 49 ms expose-to-develop-time using a laser wavelength of 780 nm and a laser energy in the range of 0.01 to 10 μJ/cm².

The foregoing description of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A charge transport composition comprising:
   a charge transport compound;
   a binder; and
   a cyclo-aliphatic ether compound of the structure:

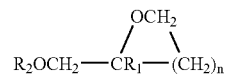

wherein n has a value of 0-10,
$R_1$ is a hydrogen atom, an aliphatic or aromatic group; and
$R_2$ is a hydrogen atom, an aliphatic group, an aromatic group, or an aliphatic/aromatic group.

2. The charge transport composition of claim 1 wherein $R_2$ is selected from an aliphatic group comprising the structure:
   —$(CH_2)_x$—$CH_3$ wherein x may have a value of 0-20.

3. The charge transport composition of claim 2 wherein x has a value of 7.

4. The charge transport composition of claim 2 wherein x has a value of 9.

5. The charge transport composition of claim 1 wherein said cyclo-aliphatic ether compound comprises a mixture of compounds having the following structures:

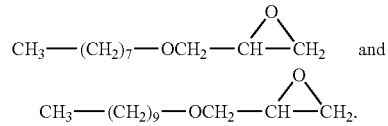

6. The charge transport composition of claim 1 wherein said charge transport compound is present in the range of about 5 to 50% by weight, said binder is present in the range of about 25-95% by weight and said cyclo-aliphatic ether compound is present in the range of about 1-25% by weight.

7. A photoconductor comprising:
   a substrate;
   a charge generation layer covering at least a portion of said substrate, and
   a charge transport layer covering at least a portion of said charge generation layer, said charge transport layer comprising:
   a charge transport compound;
   a binder; and
   a cyclo-aliphatic ether compound of the structure:

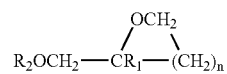

wherein n has a value of 0-10,
$R_1$ is a hydrogen atom, an aliphatic or aromatic group, and
$R_2$ is a hydrogen atom, an aliphatic group, an aromatic group or an aliphatic/aromatic group.

8. The photoconductor of claim 7 wherein $R_2$ is selected from an aliphatic group comprising the structure:

—$(CH_2)_x$—$CH_3$ wherein x may have a value of 0-20.

9. The photoconductor of claim 8 wherein x has a value of 7.

10. The photoconductor of claim 8 wherein x has a value of 9.

11. The photoconductor of claim 7 wherein said cyclo-aliphatic ether compound comprises a mixture of compounds having the following structures:

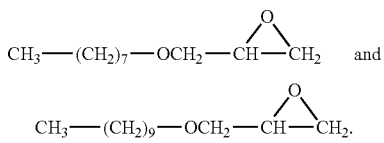

12. The photoconductor of claim 7 wherein said charge transport compound is present in the range of about 5 to 50% by weight, said binder is present in the range of about 25-95% by weight and said cyclo-aliphatic ether compound is present in the range of about 1-25% by weight.

13. The photoconductor of claim 7 wherein said photoconductor exhibits a discharge voltage in the range of −100V to −400V at 49 ms expose-to-develop-time using a laser wavelength of 780 nm and a laser energy in the range of 0.01 to 10 µJ/cm² measured.

14. The photoconductor of claim 7 located in a printer cartridge.

15. A printer having a photoconductor comprising:
   a substrate;
   a charge generation layer covering at least a portion of said substrate; and
   a charge transport layer covering at least a portion of said charge generation layer, said charge transport layer comprising:
   a charge transport compound;
   a binder; and
   a cyclo-aliphatic ether compound of the structure:

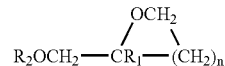

wherein n has a value of 0-10,
   $R_1$ is a hydrogen atom, an aliphatic or aromatic group, and
   $R_2$ is a hydrogen atom, an aliphatic group, an aromatic group or an aliphatic/aromatic group.

16. The printer of claim 15 wherein $R_2$ is selected from an aliphatic group comprising the structure:

—$(CH_2)_x$—$CH_3$ wherein x may have a value of 0-20.

17. The printer of claim 16 wherein x has a value of 7.

18. The printer of claim 16 wherein x has a value of 9.

19. The printer of claim 15 wherein said cyclo-aliphatic ether compound comprises a mixture of compounds having the following structures:

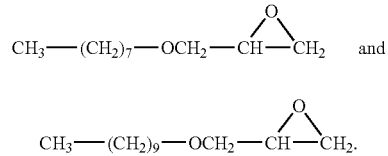

20. The printer of claim 15 wherein said charge transport compound is present in the range of about 5 to 50% by weight, said binder is present in the range of about 25-95% by weight and said cyclo-aliphatic ether compound is present in the range of about 1-25% by weight.

* * * * *